United States Patent
Park et al.

(10) Patent No.: US 7,126,266 B2
(45) Date of Patent: Oct. 24, 2006

(54) FIELD EMISSION ASSISTED MICRODISCHARGE DEVICES

(75) Inventors: Sung-Jin Park, Champaign, IL (US); J. Gary Eden, Mahomet, IL (US); Kyung-Ho Park, Suwon (KR)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 10/891,417

(22) Filed: Jul. 14, 2004

(65) Prior Publication Data

US 2006/0012277 A1 Jan. 19, 2006

(51) Int. Cl.
*H01J 1/62* (2006.01)

(52) U.S. Cl. .................. 313/495; 313/309
(58) Field of Classification Search ........ 313/309, 313/495–497, 356, 491–493
See application file for complete search history.

(56) References Cited

U.S. PATENT DOCUMENTS

| | | | |
|---|---|---|---|
| 6,016,027 A | 1/2000 | DeTemple et al. | |
| 6,051,923 A * | 4/2000 | Pong | 313/495 |
| 6,139,384 A | 10/2000 | DeTemple et al. | |
| 6,194,833 B1 | 2/2001 | DeTemple et al. | |
| 6,239,547 B1 * | 5/2001 | Uemura et al. | 313/495 |
| 6,538,367 B1 * | 3/2003 | Choi et al. | 313/309 |
| 6,563,257 B1 | 5/2003 | Vojak et al. | |
| 6,626,720 B1 * | 9/2003 | Howard et al. | 445/24 |
| 6,657,370 B1 | 12/2003 | Geusic | |

OTHER PUBLICATIONS

S.J. Park, J.G. Eden, K.H. Park, "Carbon Nanotube-Enhanced Performance of Microplasma Devices", Applied Physics Letters, vol. 84, No. 22, May 31, 2004, pp. 4481-4483.

C. Tang, Y. Bando, "Effect of BN Coatings on Oxidation Resistance and Field Emission of SiC Nanowires", Applied Physivs Letters, vol. 83, No. 4, Jul. 28, 2003, pp. 659-661.

C.J. Lee, T.J. Lee, S.C. Lyu, Y. Zhang, H.Ruh, H.J. Lee, "Field Emission from Well-Aligned Zinc Oxide Nanowires Grown at Low Temperature", Applied Physics Letters, vol. 81, No. 19, Nov. 4, 2002, pp. 3648-3650.

Y.H. Lee, C.H. Choi, Y.T. Jang, E.K. Kim, B.K. Ju, N.K. Min, J.H. Ahn, "Tungsten Nanowires and Their Field Electron Emission Properties", Applied Physics Letters, vol. 81, No. 4, Jul. 22, 2002, pp. 745-747.

Z.S. Wu, S.Z. Deng, N.S. Xu, J. Chen, J. Zhou, J.Chen, "Needle-Shaped Silicon Carbide Nanowires: Synthesis and Field Electron Emission Properties", vol. 80, No. 20, May 20, 2002, pp. 3829-3831.

S.J. Park, K.H. Park, J.G. Eden, "Integration of Carbon Nanotubes with Microplasma Device Cathodes: Reduction in Operating and Ignition Voltages", Electronics Letters, vol. 40, No. 9, Apr. 29, 2004.

J. Zhou, N.S. Xu, S.Z. Deng, J. Chen, J.C. She, Z.L. Wang, "Large-Area Nanowire Arrays of Molybdenum and Molybdenum Oxides: Synthesis and Field Emission Properties", Advanced Materials, vol. 15, No. 21, Nov. 4, 2003, pp. 1835-1840.

J.J. Chiu, C.C. Kei, T.P. Perng, W.S. Wang, "Organic Semiconductor Nanowires for Field Emission", Advanced Materials, vol. 15, No. 16, Aug. 15, 2003, pp. 1361-1364.

* cited by examiner

*Primary Examiner*—Joseph Williams
(74) *Attorney, Agent, or Firm*—Greer, Burns & Crain, Ltd

(57) ABSTRACT

Field emission nanostructures assist operation of a microdischarge device. The field emission nanostructures are integrated into the microdischarge device(s) or are situated near an electrode of the microdischarge device(s). The field emission nanostructures reduce operating and ignition voltages compared to otherwise identical devices lacking the field emission nanostructures, while also increasing the radiative output of the microdischarge device(s).

26 Claims, 8 Drawing Sheets

FIELD EMISSION ASSISTED MICRODISCHARGE DEVICES

STATEMENT OF GOVERNMENT INTEREST

This invention was made with Government assistance under U.S. Air Force Office of Scientific Research grant No. F49620-03-1-0391. The Government has certain rights in this invention.

FIELD OF THE INVENTION

A field of the invention is microdischarge devices and arrays. Additional fields of the invention include all fields making use of incoherent light, and certain embodiments of the invention are further applicable to fields making use of coherent light. Example applications for devices of the invention that produce incoherent emissions include displays and more general lighting applications. Example applications for devices of the invention that produce coherent emissions include, for example, the fields of fiber optic communications, biomedical diagnostics, and environmental sensing.

BACKGROUND OF THE INVENTION

Microdischarge devices, also known as microplasma or microcavity discharge devices, have been developed as a substitute for other light producing devices. Microdischarge devices are disclosed in U.S. patents that are incorporated by reference herein: U.S. Pat. No. 6,563,257, entitled Multilayer Ceramic Microdischarge Device; U.S. Pat. No. 6,541,915, entitled High Pressure Arc Lamp Assisted Start Up Device and Method; U.S. Pat. No. 6,194,833, entitled Microdischarge Lamp and Array; U.S. Pat. No. 6,139,384, entitled Microdischarge Lamp Formation Process; and U.S. Pat. No. 6,016,027, entitled Microdischarge Lamp.

In a recent application, we have disclosed phase-locked arrays of microdischarges devices, and microdischarge devices that are stimulated by AC, RF or pulsed excitation. The application is entitled Phase Locked Microdischarge Array and AC, RF or Pulse Excited Microdischarge, was filed on Apr. 22, 2004, and has been accorded Ser. No. 10/829,666. This application is also incorporated by reference herein.

Carbon nanotubes are field emission nanostructures that have remarkable physical and electronic properties. The utility of carbon nanotubes as a field emitter has prompted the development of new methods for the controlled growth of nanotubes and the introduction of vacuum electronic devices, including displays and sensors. Electronic applications of carbon nanotubes have typically relied solely on field emission as the current source, which requires electrode voltages in the range of 150V up to 1 kV, and places constraints on the length and diameter of carbon nanotubes as well as the surface number density of carbon nanotubes in an array. See, e.g., Choi, et al., "Electrophoresis Deposition of Carbon Nanotubes for Triode-Type Field Emission Display," Appl. Phys. Lett., 78, pp. 1547–49 (2001); Modi et al., "Miniaturized Gas Ionization Sensors Using Carbon Nanotubes," Nature, 424, pp. 171–74 (2003).

Other nanostructures have also been found to readily produce field emissions. Examples include silicon carbide nanowires, zinc oxide nanowires, molybdenum and molybdenum oxide nanowires, organic semiconductor nanowires, and tungsten nanowires. See, e.g., Tang and Bando, "Effect of BN Coatings on Oxidation Resistance and Field Emission of SiC Nanowires", Appl. Phys. Lett, Vol. 83, No. 4 (28 Jul. 2003); Lee et al., "Field Emission From Well-Aligned Zinc Oxide Nanowires Grown at Low Temperature", Appl. Phys. Lett., Vol. 81, No. 19 (4 Nov. 2002); Zhou et al., "Large-Area Nanowire Arrays of Molybdenum and Molybdenum Oxides: Synthesis and Field Emission Properties," Adv. Mater., Vol. 15, No. 21 (4 Nov. 2003); Chiu et al., "Organic Semiconductor Nanowires for Field Emission", Adv. Mater., Vol. 15, No. 16, (15 Aug. 2003); Min and Ahn, "Tungsten Nanowires and Their Field Electron Emission Properties," Appl. Phys. Lett., Vol. 81, No. 4 (22 Jul. 2002); and Wu et al., "Needle-Shaped Silicon Carbide Nanowires: Synthesis and Field Electron Emission Properties," Appl. Phys. Lett., Vol. 80, No. 20 (20 May 2002).

SUMMARY OF THE INVENTION

In the invention, field emission nanostructures assist operation of a microdischarge device by providing an auxiliary source of current. The field emission nanostructures are integrated into the microdischarge device(s) or are situated near an electrode of the microdischarge device(s). The field emission nanostructures reduce operating and ignition voltages of the microdischarge device compared to otherwise identical devices lacking the field emission nanostructures, while also increasing the radiative output of the microdischarge device(s).

DETAILED DESCRIPTION OF THE PREFERRED EMBODIMENTS

The invention concerns microdischarge devices with field emission nanostructure assisted operations. Example embodiments of the invention include a microdischarge device having field emission nanostructures integrated into the device and a microdischarge device having field emission nanostructures disposed near a cathode of the device. An exemplary method of the invention includes using field emission nanostructures to assist in the operation of a microdischarge device. An exemplary array of the invention includes a plurality of microdischarge devices in which each device (pixel) has field emission nanostructures that assist in its operation.

The invention is applicable to many different microdischarge devices, including microdischarge devices described in the U.S. patents and the U.S. patent application that are incorporated by reference herein. The invention will now be illustrated by discussing preferred embodiment devices. Artisans will appreciate the more general applicability of the invention to other microdischarge devices. In describing the invention, particular exemplary devices, formation processes, and device applications will be used for purposes of illustration. Dimensions and illustrated devices may be exaggerated for purposes of illustration and understanding of the invention. The elements of the drawings are not necessarily to scale relative to one another. Schematic views will be understood by artisans as such views are commonly used in the art. Devices and arrays of the invention may be fabricated by processes well known to the semiconductor device and MEMs communities.

Figure 1:
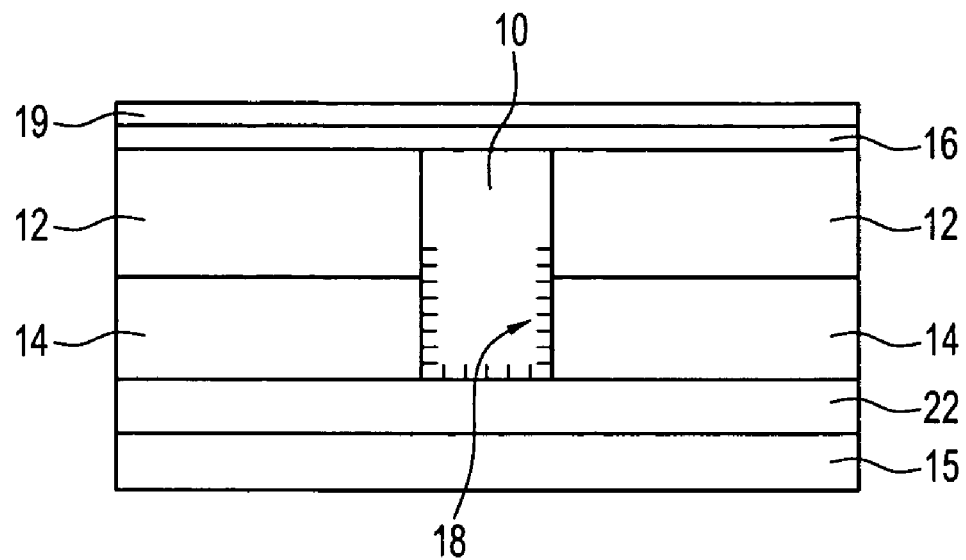
FIG. 1 is a schematic cross-section of an exemplary embodiment microdischarge device of the invention.
Figure 2:
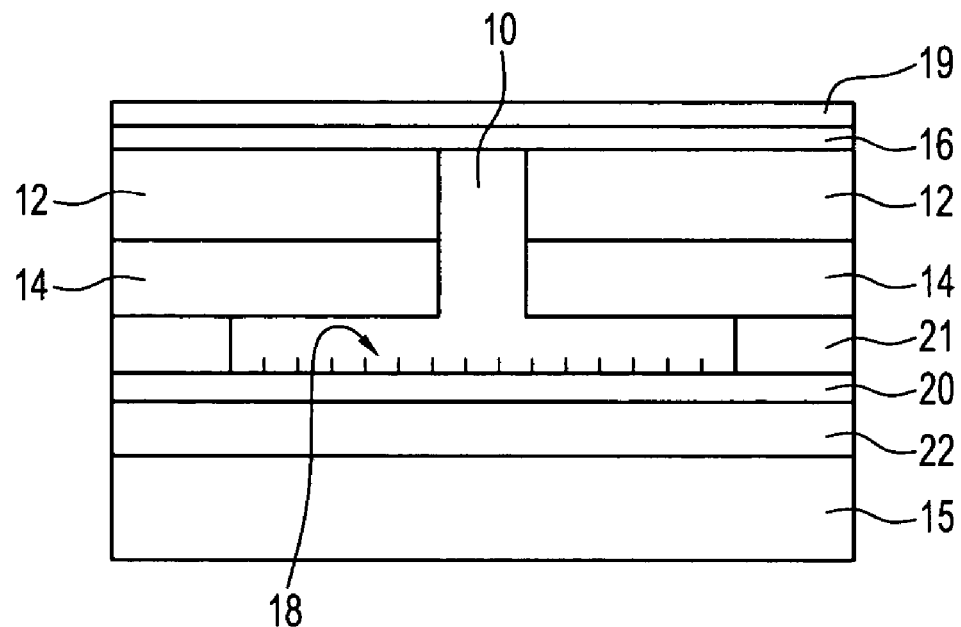
FIG. 2 is a schematic cross-section of another exemplary embodiment microdischarge device of the invention.

FIG. 1 shows an example device of the invention. A microdischarge cavity 10 is formed in a dielectric 12 and a conductive or semi-conductive layer 14 to form a hollow cathode. A substrate 15, e.g., silicon, supports the device. The dielectric 12 may be realized, for example, by a single material layer. In another example, the dielectric 12 is realized by several material layers so as to grade the dielectric constant. The substrate 15 may also be one or several layers. For example, in embodiments of the invention the substrate 15 might comprise a semiconductor wafer with multiple device layers, interconnect layers and dielectric layers. The substrate 15 might also be an insulator, such as ceramic material or glass, or a flexible material such as Kapton. The conductive layer 14 may be fabricated from a metal, semiconductor, conducting polymer or other conducting material. When a sufficient voltage is applied between anode 16 and the cathode 14, the anode 16, which may be, for example, a screen, a transparent electrode (e.g., indium tin oxide), or an annular film, causes a discharge to be produced from the discharge medium contained in the microdischarge cavity 10. Field emission nanostructures 18 are within the hollow cathode formed by the microdischarge cavity 10. FIG. 2 shows another example embodiment. In FIG. 2, field emission nanostructures 18 are disposed proximate to the hollow cathode, on a second cathode 20 and joined by a spacer layer 21, which may be a dielectric or conductive or semi-conductive material. In FIGS. 1 and 2, a transparent layer 19 seals the discharge medium and acts as a window to permit emissions to pass. In the case where a transparent electrode is used as the anode, the transparent layer 19 may not be necessary as the transparent electrode may seal the discharge medium in the microdischarge cavity. If desired, a voltage can be applied between the cathode 14 and the second cathode 20 to control the flow of current into the microdischarge cavity 10. A dielectric 22 provides electrical isolation between 20 and 15 and layer 21 may also be dielectric to provide electrical isolation between 14 and 20. In other embodiments that are variations of the FIG. 1 device, the dielectric layer 22 is omitted and the cathode 14 is at the same potential as the substrate 15. In a variation of the FIG. 2 device, dielectric 22 is omitted and the second cathode 20 and substrate 15 are at the same potential. Additionally, if the spacer layer 21 is conductive, then the cathode 14 and the second cathode 20 may also be at the same potential.

In example embodiments, the field emission nanostructures are carbon nanotubes. Other example embodiments include different types of field emission nanostructures, such as silicon carbide nanowires, zinc oxide nanowires, molybdenum and molybdenum oxide nanowires, organic semiconductor nanowires, and tungsten nanowires. Experiments have been conducted to demonstrate the invention. The experimental devices used carbon nanotubes as the field emission nanostructures. Artisans will appreciate the applicability of other field emission nanostructures.

Experimental devices having both the general FIG. 1 and FIG. 2 structure were tested and demonstrated improved results relative to otherwise identical devices lacking the field emission nanostructure assisted operation of the invention. For example, carbon nanotubes grown within 200 µm diameter microcavity Ni screen/BN dielectric/Ni cathode devices reduced operating voltages by as much as 18–22% when operated within a vacuum system at gas pressures of hundreds of Torr. The experimental devices were operated in a vacuum, and the cavities accordingly were not sealed with a transparent layer 19 that is shown in FIGS. 1 and 2. Also, the experimental devices lacked the dielectric layer 22 shown in FIGS. 1 and 2. In addition, the experimental FIG. 2 device was not an integrated device. In the experimental device, the carbon nanotubes were on a separate electrode held at a distance of ~25 µm from the cavity.

The lower size limit of the diameter of the microdischarge cavities 10 in which the microdischarges are generated is limited primarily by the microfabrication techniques used to form the microdischarge cavities. Although the microdischarge cavities (for the prototype carbon nanotube assisted devices) are cylindrical and have typical diameters of 200 µm, fabricating microplasma devices of much smaller (<10 µm) or larger sizes is straightforward with well-known microfabrication techniques. In addition, the cross-section of the individual microdischarge devices need not be circular, though that is the shape of the microdischarge cavities 10 in the exemplary embodiments of FIGS. 1 and 2.

The discharge medium is a vapor or a gas (or gas mixture) that produces light emissions. The type of discharge medium used in the microdischarge cavities 10 can alter the spectrum emitted by the microdischarge and, hence, the nature of the display. Discharge media in exemplary embodiments include a wide variety of vapors and gases such as the atomic rare gases, $N_2$, and the rare gas-halide molecules (i.e., rare gas-halogen donor gas mixtures). Each of the microdischarges is operated at pressures up to and beyond one atmosphere. Fabrication and the operation of microdischarges are discussed in the U.S. patents that are incorporated by reference herein: U.S. Pat. No. 6,563,257, entitled Multilayer Ceramic Microdischarge Device; U.S. Pat. No. 6,194,833, entitled Microdischarge Lamp and Array; U.S. Pat. No. 6,139,384, entitled Microdischarge Lamp Formation Process; and U.S. Pat. No. 6,016,027, entitled Microdischarge Lamp.

The experimental microdischarge devices were fabricated in Ni(50 µm thick)/BN(~70 µm)/Ni screen structures. A boron nitride (BN) layer was deposited by printing a BN-binder paste and the organic binder was removed by baking at 100° C. The microdischarge cavity was formed by microdrilling and its diameter was 200 µm. This diameter was selected so as to have a moderate operating pressure (typically 100–300 Torr for the rare gases) for the device. Boron nitride is advantageous as a dielectric since it is durable. As a refractory material, it is also able to withstand the high temperatures required for the chemical vapor deposition process in which carbon nanotubes are produced.

Carbon nanotubes (CNTs) were grown into the cavity of a hollow microdischarge cathode (for the device in accordance with FIG. 1) or on the silicon substrate (for the device in accordance with FIG. 2) using the hot-filament chemical vapor deposition (HFCVD) method. See, e.g., Park et al., J. Vac. Sci. Tech. B., 19, p. 958 (2001). A NiFe-alloy was used as a catalyst. Prior to the CNT growth, a 100 nm-thick titanium layer was deposited to enhance the CNT adhesion, which was followed by the deposition of a 60 nm-thick NiFe-alloy catalyst layer. The CNT growth was carried out using a mixture of 10% methane and 90% hydrogen as the source (feedstock) gases at a total pressure of 30 Torr and a substrate temperature of 700° C. The deposited CNTs were multiwall in structure and the diameters of the nanotubes were typically 40~80 nm.

Figure 3:
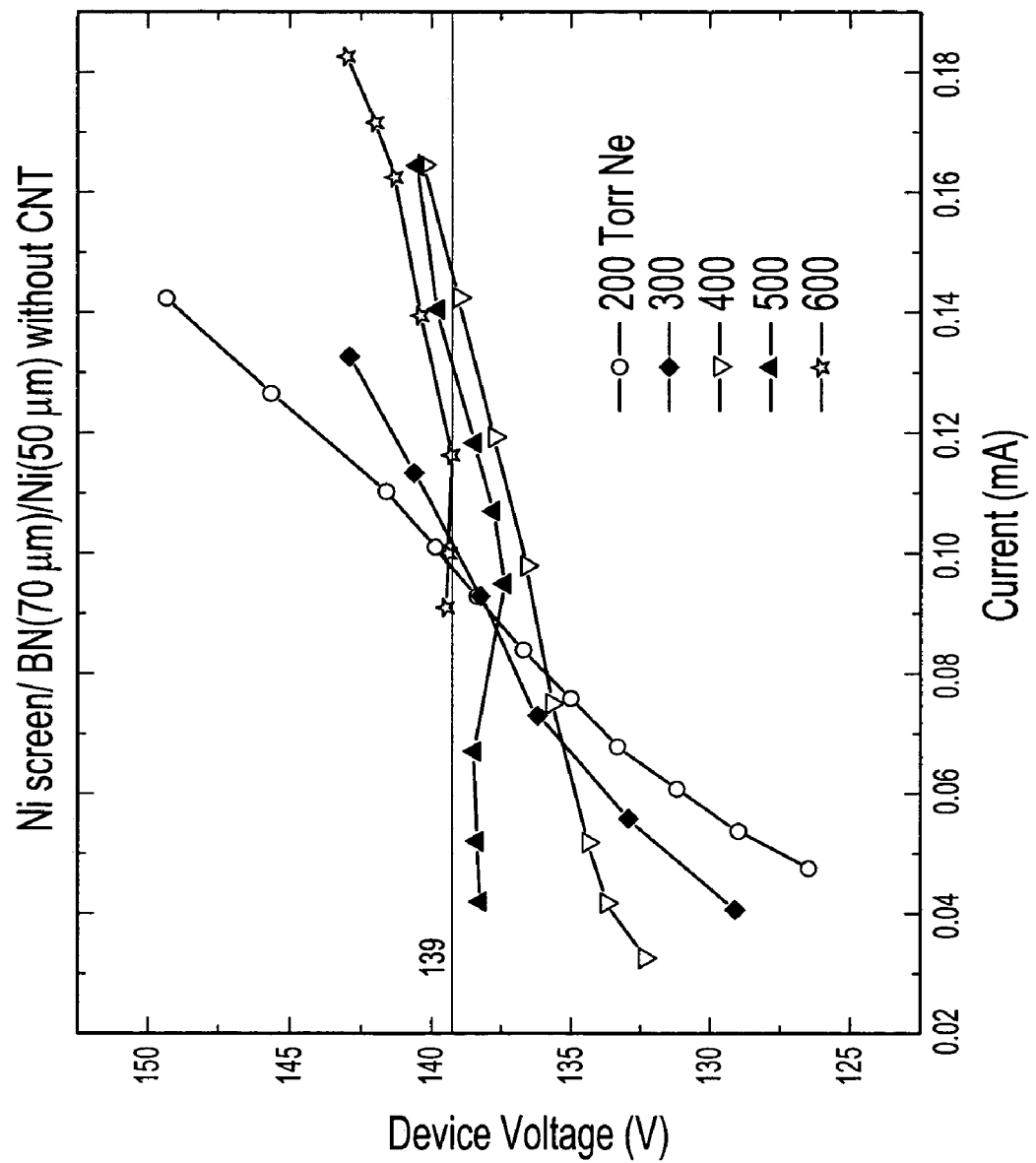
FIG. 3 shows the I–V curves for a device lacking carbon nanotubes but otherwise in accordance with the FIG. 1 device.

All of the experimental devices were operated with neon gas in microdischarge cavity 10 and 380 kΩ of external ballast. Neon was selected because of its well-known visible and ultraviolet emission and serves as a baseline gas for facilitating comparisons. In the V-I characteristics of microdischarge devices without CNTs, the lowest operational voltage was observed to be 125–130 V for $p_{Ne}$=200–300 Torr (FIG. 3). At higher pressures (400–600 Torr), the differential resistivity of the V-I curves is generally positive but the operating voltages are higher.

Figure 4:
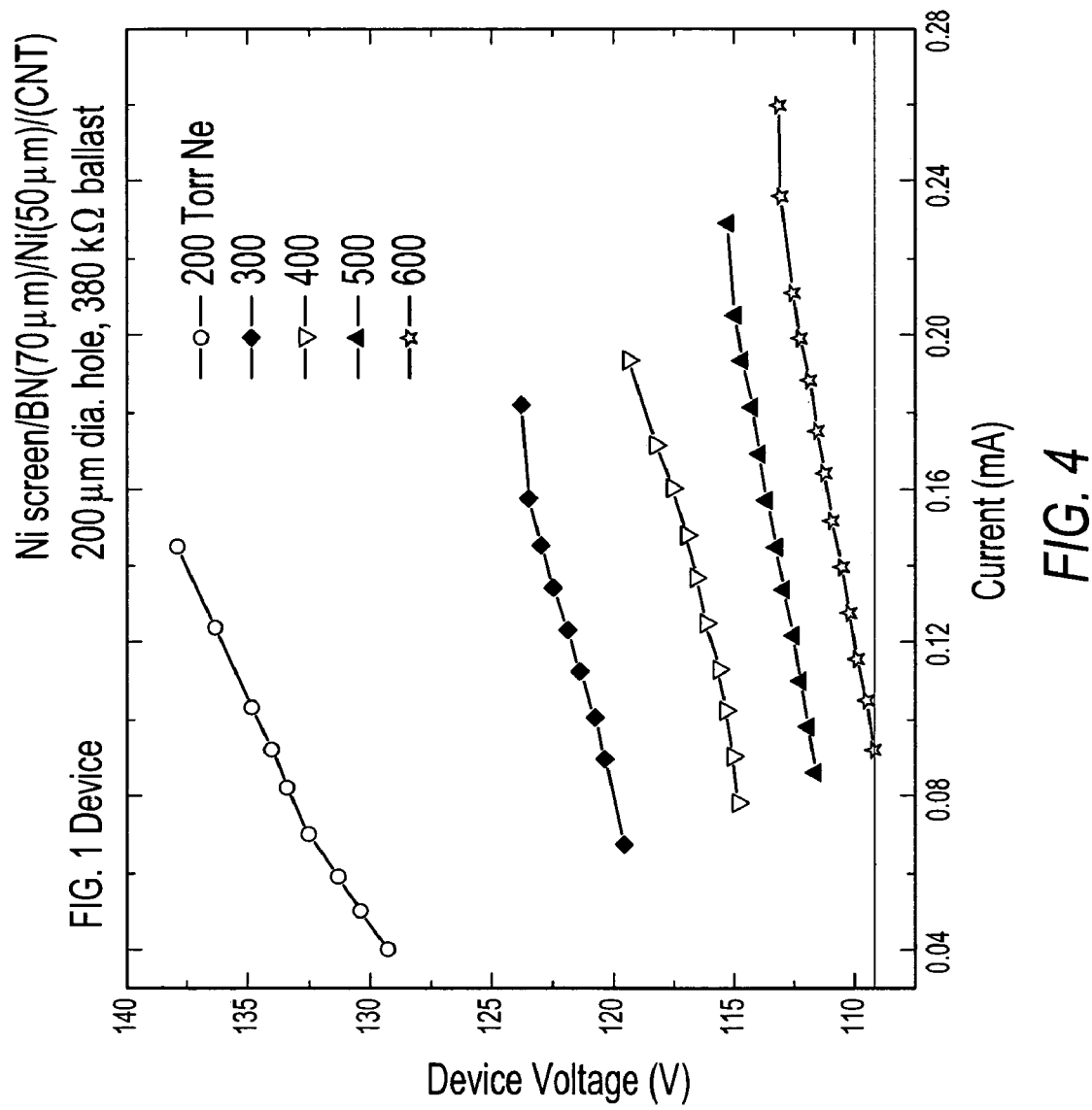
FIG. 4 shows the I–V curves of an experimental device in accordance with FIG. 1.

FIG. 4 shows the V-I curves of the experimental FIG. 1 device. Compared to the device without CNTs (FIG. 3), the operating voltages drop by 10–30 V and higher currents are now accessible. Field emission from the field emission nanostructures within the microdischarge cavity 10 appears to be responsible for the lowered operating voltages of the device. Another interesting feature from the performance of the FIG. 1 experimental device is that the pressure dependence of the V-I characteristics is quite different from that of the microdischarge device without CNTs. In FIG. 4, it is clear that the minimum operating voltage drops monotonically with increasing pressure, which also provides evidence for the influence of field emission from the CNTs.

Figure 5:
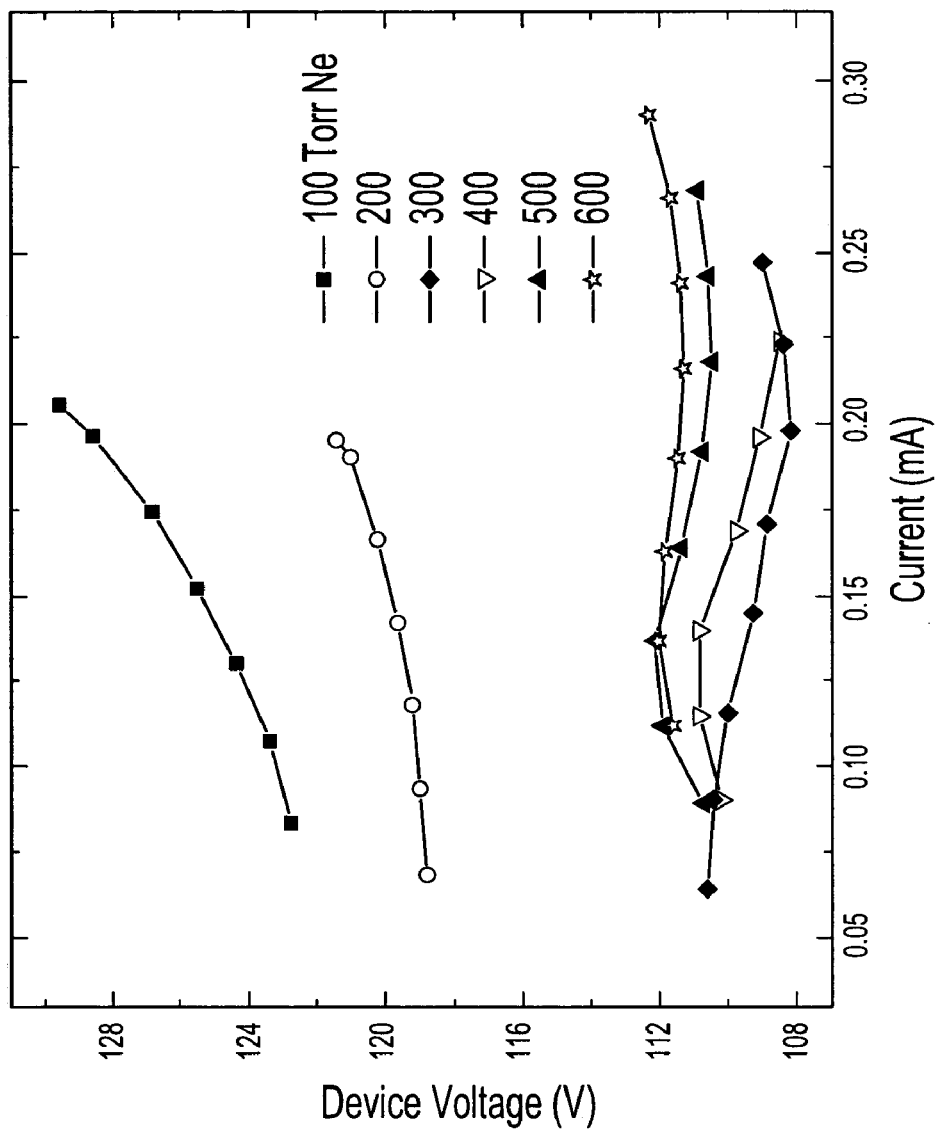
FIG. 5 shows the I–V curves of an experimental device in accordance with FIG. 2.

In the case of the experimental FIG. 2 device, reductions in operating voltage similar to those of FIG. 3 are obtained. Minimum operating voltages of 108–112 V were measured for Ne gas pressures of 300–600 Torr (FIG. 5). In contrast with the device structure of FIG. 1, however, the operating voltage of the FIG. 2 device does not continue to fall for Ne gas pressures above approximately 300 Torr. From the experiments, it is clear that increasing $p_{Ne}$ from 100 to 300 Torr results in a rapid drop in the operating voltage but further increases in pressure cause the voltage to actually rise slightly. This is attributed to the fact that these data were obtained for a device in accordance with FIG. 2 in which the CNTs were grown on a Si wafer that was positioned ~25 μm below the cathode aperture. Consequently, electrons produced at the CNTs by field emission must travel a short distance before entering the cathode. At 300 Torr of gas pressure in the device, 25 μm corresponds to several mean free paths for electron-neutral particle collisions.

Figure 6:
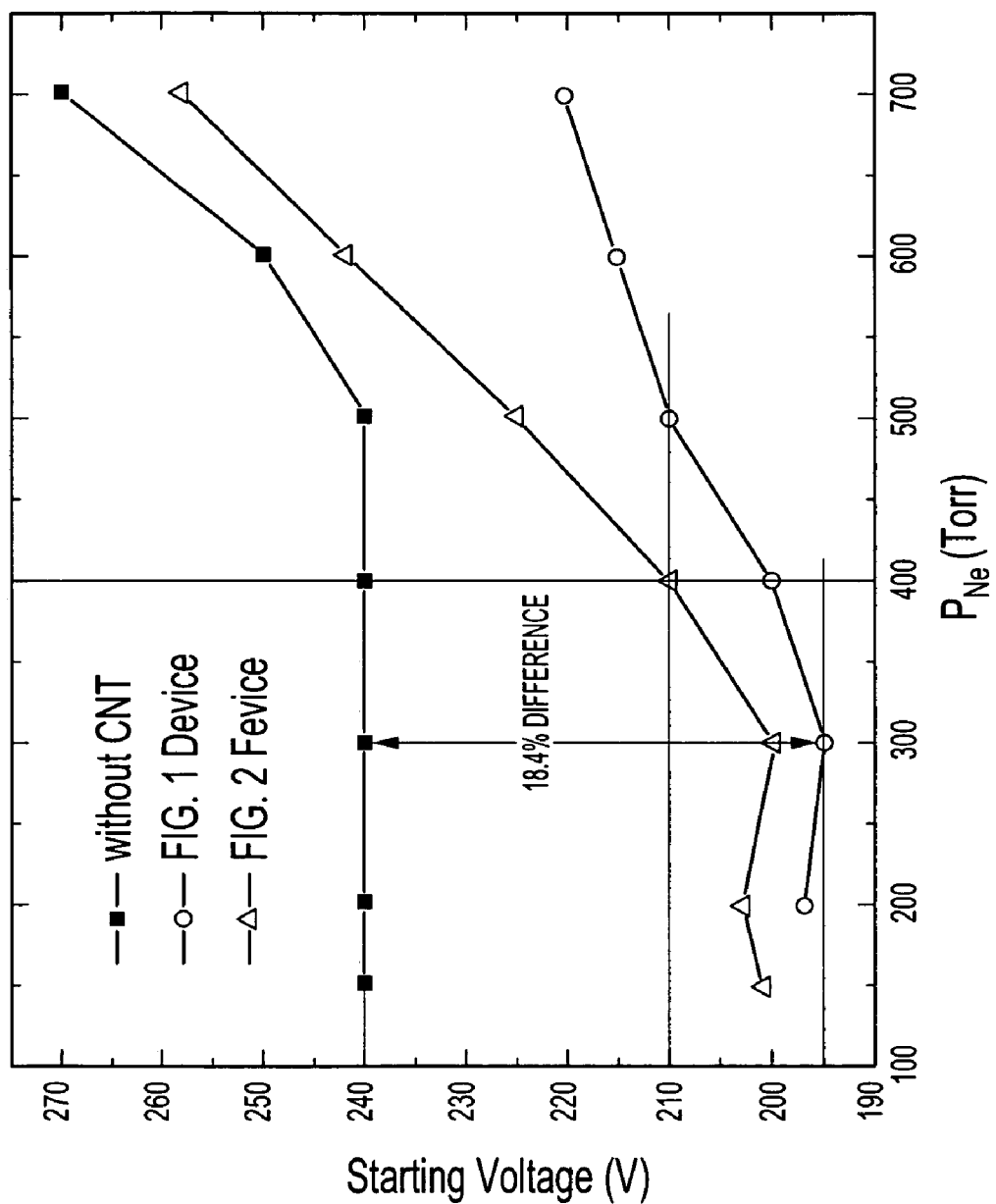
FIG. 6 plots starting voltages for an experimental device lacking carbon nanotubes and for experimental devices in accordance with FIGS. 1 and 2.

In addition to the decrease in the device operating voltages, the starting (ignition) voltages also show marked improvement when CNTs are used. In FIG. 6, it is clear that microdischarge devices with CNTs exhibit ignition voltages 30–40 V lower than an otherwise identical device without CNTs. At low Ne pressures (≦300 Torr), the starting voltage for the FIG. 2 device (external CNT array) is ~200 V which is ~40 V lower than that required for an identical device without CNTs. For $p_{Ne}$>300 Torr, the impact of the CNT array on the starting voltage gradually diminishes until, at $p_{Ne}$=700 Torr, the difference in voltages is only ~4% (11 V out of 270 V). Greater reduction in the ignition voltage is observed if the CNTs are incorporated into the microdischarge cavity, as in the FIG. 1 device. Furthermore, these improvements are sustained at higher gas pressures. At 700 Torr, for example, the device having CNTs in the cathode has a starting voltage of ~200 V, or ~19% less than that required by the device without CNTs. To summarize FIG. 6, above 300–400 Torr, the ignition voltage required for the FIG. 2 device rises quickly and approaches the values for the device having no CNTs. This is again a reflection of the necessity for CNT-produced electrons to traverse a 25 μm gap before entering the cathode. Such is not the case where electrons are produced by CNTs within the cathode and, therefore, the FIG. 1 device voltage remains as much as 50 V below that for the device without CNTs, even for gas pressures up to 700 Torr.

Figure 7:
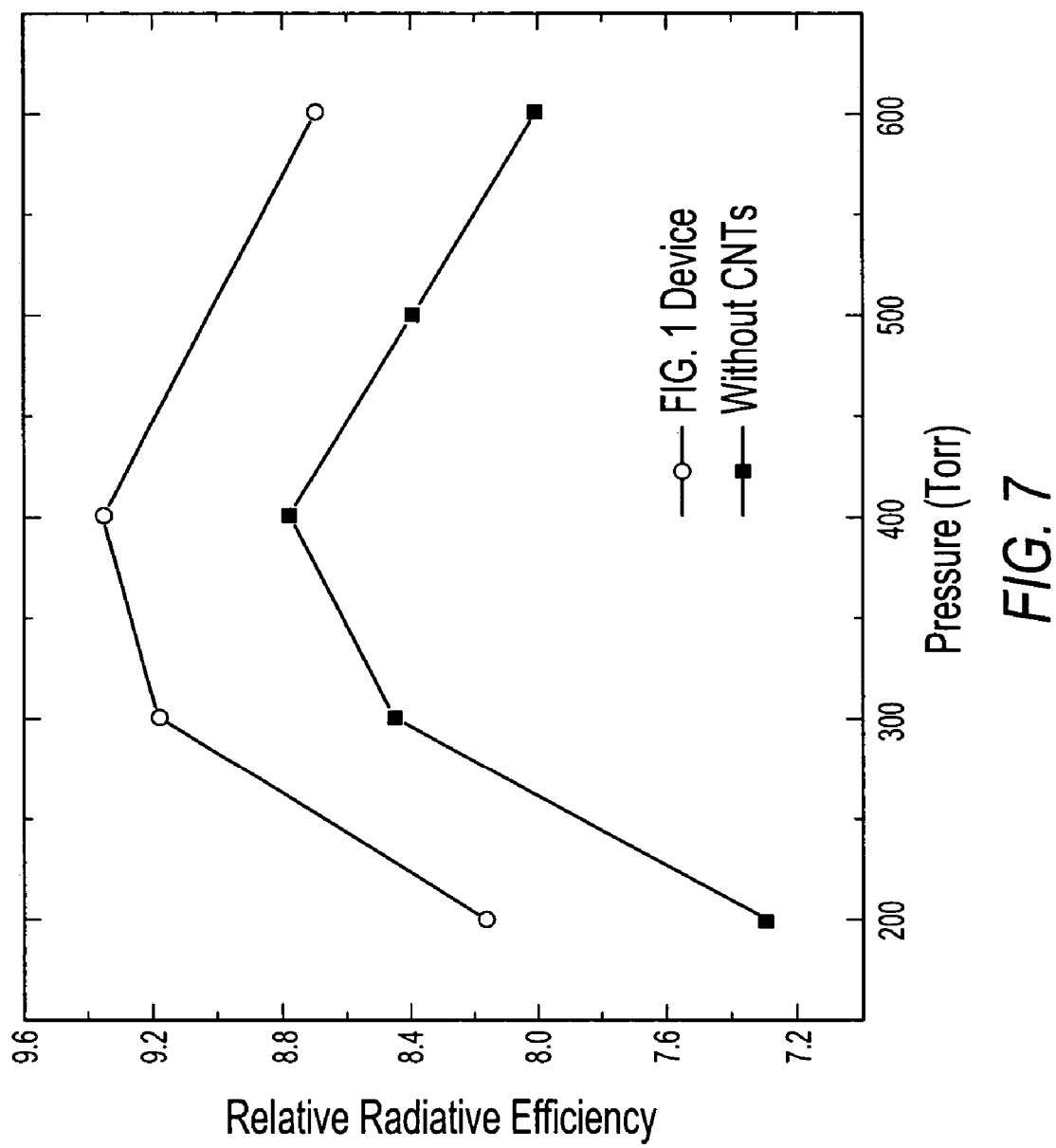
FIG. 7 plots efficiency for an experimental device in accordance with FIG. 1 and for a device lacking carbon nanotubes.

Not only are the operating and ignition voltages of microdischarge devices improved by the incorporation of CNTs, but the radiative efficiency also improves. Measurements of the radiant output (in the 300–800 nm spectral region) of the microplasma devices with CNTs were also made as a function of pressure with a calibrated photodiode. As shown in FIG. 7, which compares the results for the FIG. 1 structure (CNTs in the cathode) with those for a device without CNTs, the presence of the nanotubes increases the relative radiative efficiency (integrated over the 300–800 nm spectral interval) over the entire pressure range investigated increased by as much as 9%. For a constant voltage of 240 V applied to the device, the radiative efficiency is higher by more than 5% for all Ne pressures between 200 and 700 Torr compared to another device having the FIG. 1 structure but lacking CNTs. One reason for the improvement is that the device with CNTs (FIG. 1 device) operates at higher currents but lower voltages than does the device without CNTs.

In summary, the impact of introducing a CNT array to the microplasma device is to reduce its operating voltage by as much as ~22% for Ne in the 200–600 Torr range. The largest effect (particularly at higher gas pressures) is observed if the CNTs are grown directly onto the interior wall of the cathode microdischarge cavity.

Figure 8:
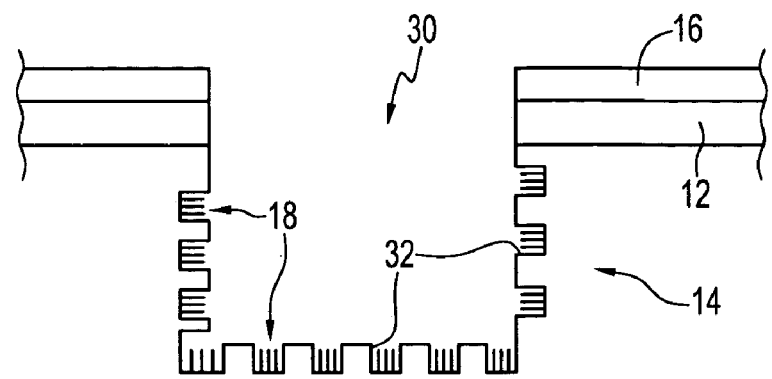
FIG. 8 is a schematic cross-section of a portion of another exemplary embodiment microdischarge of the invention.

FIG. 8 illustrates another embodiment of the invention, where a microdischarge cavity 30 formed in a microdischarge device includes one or more recesses 32. Only a portion of the microdischarge device is shown, as it may otherwise be the same, for example, as the FIG. 1 device. Known microfabrication techniques allow for formation of recesses 32 in the microdischarge cavity 30. Example fabrication techniques include reactive ion etching (RIE). The recesses 32 may be formed with any of a number of cross-sectional shapes, including, for example, cylinders and square bottom trenches. The recesses may be formed on the sidewall of the microdischarge cavity 30 and/or on the bottom. Field emission nanostructures 18 are formed in the recesses, though they may also be formed on surfaces between the recesses. The catalyst (NiFe, for example) discussed above controls the location of growth. The field emission nanostructures that are within the recesses extend slightly, if at all, into the microdischarge cavity volume. This shelters the field emission nanostructures from excessive bombardment and wear, thereby extending CNT lifetime.

Figure 9:
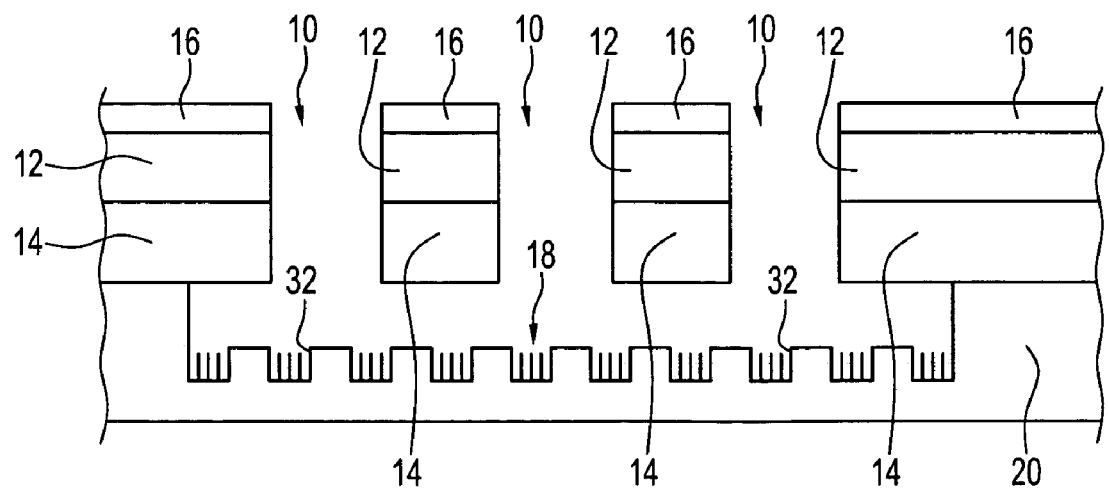
FIG. 9 is a schematic cross-section of a portion of a microdischarge array in accordance with an exemplary embodiment of the invention.
Figure 10:
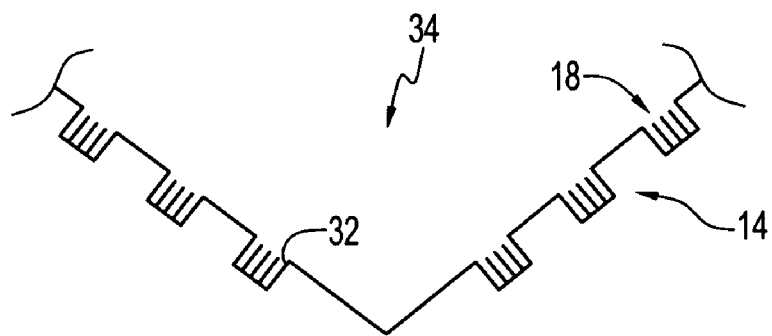
FIG. 10 is a schematic cross-section of a portion of another exemplary embodiment microdischarge of the invention.

This concept can be extended to cathodes of different geometries and devices as illustrated in FIGS. 9 and 10. FIG. 9 is a partial view of a microdischarge device array generally based upon the FIG. 2 structure. In FIG. 9, a plurality of microdischarge cavities 10 share a common second cathode 20, which has been modified compared to FIG. 2 to include recesses 32 that have field emission nanostructures 18 as in the FIG. 8 structure. In an alternate embodiment, the cathode 20 forms the sole cathode for the plurality of microdischarge cavities, i.e., the conductive layer 14 is omitted. FIG. 10 illustrates part of a microdischarge device with a microdischarge cavity 34 having a tapered shape that is narrower toward the bottom of the microdischarge cavity 34. The versatility of the field emission nanostructure assisted microdischarge to a variety of microdischarge cavity geometries and devices will be apparent to artisans.

Figure 11:
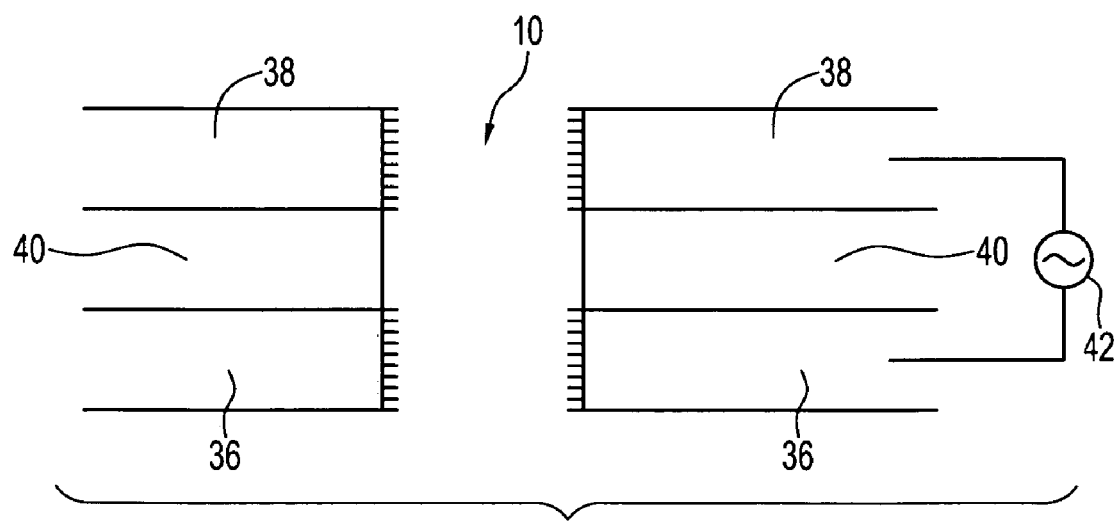
FIG. 11 is a schematic cross-section of a portion of another exemplary embodiment microdischarge of the invention.

An embodiment of the invention in which a microdischarge device is driven by AC, RF, or pulsed (such as bipolar) excitation is illustrated in FIG. 11. Such excitation, in addition to DC excitation, may be used with any of the devices discussed above. In the case of the FIG. 11 device, AC, RF or pulsed excitation will produce discharge within cavity 10 in each half cycle of an excitation waveform. Conducting electrodes 36, 38 are separated by a dielectric layer 40 that may range in thickness from less than 1 μm to several millimeters. During excitation, each of the electrodes 36 and 38 switches between acting as a cathode and anode. Field emission nanostructures are grown onto the interior surfaces of the microdischarge cavity 10 but are disposed to avoid an electrical short between the conducting electrodes 36, 38. Field emission nanostructure growth may cover some portion of the microdischarge cavity in the dielectric portion of the microdischarge cavity, provided that the device is not electrically shorted and will accommodate the required electric field strengths. An alternate embodiment includes recesses, as in FIGS. 8–10 with the field emission nanostructures grown within recesses on the inner wall of the microdischarge cavity. A source 42 provides AC, RF or pulsed excitation and, in this device, optical radiation is emitted from both ends of the microdischarge cavity 10. In an additional embodiment, a reflective surface or element may be placed at one end of the microdischarge cavity to enhance the extraction of optical power from the other end of the cavity.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A microdischarge device, comprising:
a microdischarge cavity containing discharge medium;
a cathode contacting the discharge medium;
an anode electrically isolated from said cathode and disposed relative to the said cathode and the discharge medium such that said anode and said cathode stimulate emissions from the discharge medium when excitation is applied to said anode and cathode;
field emission nanostructures disposed on or proximate to said cathode.

2. The device of claim 1, wherein said field emission nanostructures are disposed on said cathode.

3. The device of claim 2, wherein said field emission nanostructures are disposed within said microdischarge cavity.

4. The device of claim 3, wherein said cathode comprises a hollow cathode that said microdischarge cavity penetrates.

5. The device of claim 4, further comprising recesses formed in a surface of said hollow cathode, wherein said field emission nanostructures are disposed in said recesses.

6. The device of claim 1, wherein said cathode comprises a hollow cathode that said microdischarge cavity penetrates.

7. The device of claim 6, further comprising a second cathode separated from and proximate to said hollow cathode, and wherein said field emission nanostructures are disposed on said second cathode.

8. The device of claim 1, wherein said anode comprises a screen anode.

9. The device of claim 1, wherein said anode comprises a transparent electrode.

10. The device of claim 9, wherein said transparent anode comprises indium tin oxide.

11. The device of claim 1, wherein said anode comprises an annular electrode.

12. The device of claim 1, wherein:
said microdischarge cavity is formed in a substrate that comprises said cathode such that said microdischarge cavity is formed as a hollow cathode,
said anode is formed as a transparent electrode sealing said microdischarge cavity; and further comprising a dielectric layer to electrically isolate said transparent electrode from said substrate.

13. The device of claim 12, further comprising recesses formed in a surface of said hollow cathode, wherein said field emission nanostructures are disposed in said recesses.

14. The device of claim 1, wherein:
said microdischarge cavity is formed in a substrate that comprises said cathode such that said microdischarge cavity is formed as a hollow cathode,
said anode is formed as a screen electrode; the device further comprising
a dielectric layer to electrically isolate said screen electrode from said substrate; and
a transparent window sealing the discharge medium in said microdischarge cavity.

15. The device of claim 14, further comprising recesses formed in a surface of said hollow cathode, wherein said field emission nanostructures are disposed in said recesses.

16. The microdischarge device of claim 1, wherein the discharge medium is selected from the group consisting of the atomic rare gases, N2, and the rare gas-halide molecules.

17. The microdischarge device of claim 1, further comprising recesses in or proximate to said cathode, wherein said field emission nanostructures are formed in said recesses.

18. The device of claim 1, comprising:
a plurality of microdischarge cavities containing discharge medium;
said cathode comprising a common cathode shared by said plurality of microdischarge cavities.

19. The device of claim 18, further comprising recesses formed in a surface of said common cathode, wherein said field emission nanostructures are disposed in said recesses.

20. A microdischarge device, comprising:
a substrate;
a microdischarge cavity in said substrate;
discharge medium contained in said microdischarge cavity;
electrodes for stimulating emission from the discharge medium;
field emission nanostructures to assist the emission from the discharge medium.

21. The microdischarge device of claim 20, wherein said field emission nanostructures comprise field emission nanostructures formed in said microdischarge cavity.

22. The microdischarge device of claim 20, wherein said field emission nanostructures comprise field emission nanostructures formed proximate said microdischarge cavity and one of said electrodes.

23. The microdischarge device of claim 20, wherein the discharge medium is selected from the group consisting of the atomic rare gases, $N_2$, and the rare gas-halide molecules.

24. The microdischarge device of claim 20, further comprising recesses to protect said field emission nanostructures.

25. A method for reducing the operating voltage of a microdischarge device, the method comprising:

provide a microdischarge device;

providing field emission nanostructures in or proximate to a microdischarge cavity in the microdischarge device;

containing discharge medium in the microdischarge cavity at a pressure; and operating the microdischarge device.

26. The method of claim 25, wherein the pressure is in the approximate range of about 100 to 700 Torr.

* * * * *

UNITED STATES PATENT AND TRADEMARK OFFICE
CERTIFICATE OF CORRECTION

PATENT NO. : 7,126,266 B2  Page 1 of 1
APPLICATION NO. : 10/891417
DATED : October 24, 2006
INVENTOR(S) : Park et al.

It is certified that error appears in the above-identified patent and that said Letters Patent is hereby corrected as shown below:

Column 5, line 33, after "within" please delete "the-microdischarge", and insert --the microdischarge-- therefor.

Signed and Sealed this

Seventh Day of August, 2007

JON W. DUDAS
*Director of the United States Patent and Trademark Office*